United States Patent
Shang

(10) Patent No.: US 9,706,232 B2
(45) Date of Patent: Jul. 11, 2017

(54) METHOD AND DEVICE FOR SENDING MEDIA DATA

(71) Applicant: ZTE CORPORATION, Shenzhen (CN)

(72) Inventor: Guoqiang Shang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/403,715

(22) PCT Filed: May 13, 2013

(86) PCT No.: PCT/CN2013/075552
§ 371 (c)(1),
(2) Date: Nov. 25, 2014

(87) PCT Pub. No.: WO2013/178016
PCT Pub. Date: Dec. 5, 2013

(65) Prior Publication Data
US 2015/0150039 A1    May 28, 2015

(30) Foreign Application Priority Data
May 28, 2012    (CN) .......................... 2012 1 0168799

(51) Int. Cl.
*H04N 7/10*    (2006.01)
*H04N 21/234*    (2011.01)
(Continued)

(52) U.S. Cl.
CPC ... *H04N 21/23424* (2013.01); *H04L 65/4076* (2013.01); *H04L 65/605* (2013.01);
(Continued)

(58) Field of Classification Search
CPC . H04N 21/812; H04N 21/4331; H04N 21/435
(Continued)

(56) References Cited

U.S. PATENT DOCUMENTS 8,855,469 B2 * 10/2014 Maharajh et al. ............ 386/248
2010/0166389 A1   7/2010 Knee
(Continued)

FOREIGN PATENT DOCUMENTS

CA    2322898 A1    4/2002
CN    101272449 A    9/2008
(Continued)

OTHER PUBLICATIONS

International Search Report for corresponding application PCT/CN2013/075552 filed May 13, 2013; Mail date Aug. 22, 2013.
(Continued)

*Primary Examiner* — Jivka Rabovianski
(74) *Attorney, Agent, or Firm* — Cantor Colburn LLP

(57) ABSTRACT

Provided are a method and device for sending media data. The method is realized by providing a media substitute node between a sender and a receiver. The method comprises: a media substitute node receives an original media data stream from a sender; the media substitute node acquires substitute data for substituting for the original media data stream within a designated interval; the media substitute node converts the format of the acquired substitute data into a media format which conforms to a media parameter of the original media data stream; and the media substitute node sends the converted substitute data to the receiver within the designated interval. The technical solution provided in the disclosure is adopted to solve the technical problems in the related art, such as the reduction in communication efficiency due to the need for re-negotiating a media parameter between substitute data and original media data.

4 Claims, 2 Drawing Sheets

(51) Int. Cl.
*H04L 29/06* (2006.01)
*H04N 21/222* (2011.01)
*H04N 21/235* (2011.01)
*H04N 21/433* (2011.01)
*H04N 21/435* (2011.01)
*H04N 21/44* (2011.01)
*H04N 21/81* (2011.01)

(52) U.S. Cl.
CPC .............. *H04L 65/80* (2013.01); *H04L 69/24* (2013.01); *H04N 21/222* (2013.01); *H04N 21/235* (2013.01); *H04N 21/2355* (2013.01); *H04N 21/435* (2013.01); *H04N 21/4331* (2013.01); *H04N 21/4355* (2013.01); *H04N 21/44016* (2013.01); *H04N 21/812* (2013.01)

(58) Field of Classification Search
USPC .......................... 725/32, 31, 36, 91, 114, 118
See application file for complete search history.

(56) References Cited

U.S. PATENT DOCUMENTS

| | | |
|---|---|---|
| 2010/0299191 A1 | 11/2010 | Fernandez Gutierrez |
| 2011/0090953 A1 | 4/2011 | Melnyk |
| 2011/0264530 A1 | 10/2011 | Santangelo |
| 2012/0254913 A1* | 10/2012 | Di Mattia et al. .............. 725/34 |

FOREIGN PATENT DOCUMENTS

| | | |
|---|---|---|
| CN | 102387411 A | 3/2012 |
| CN | 102447963 A | 5/2012 |

OTHER PUBLICATIONS

European Search Report for corresponding application EP13 79 6583; Report dated Apr. 30, 2015.

* cited by examiner

METHOD AND DEVICE FOR SENDING MEDIA DATA

TECHNICAL FIELD

The disclosure relates to the field of communication, in particular to a method and device for sending media data.

BACKGROUND

With the development of the mobile internet and upgrades of hardware and software of terminals, media data transmission (such as multimedia data transmission) has become an indispensable part, at present, once a media data stream forms, the data stream is transmitted, stopped, etc. under the interaction control of a server and a terminal and will not changes under normal circumstances, in this way, the huge potential for bearing information, which should be owned by data stream, is not brought into full play, especially, how to intersperse suitable contents in the multimedia data flow in the process of multimedia data flow transmission, for example, when a rebroadcast of a live broadcast is performed, if a source signal is in a commercial break, a local rebroadcast side wishes to change the advertisement to its own advertisement, this requires a substitute video within an interval, which does not has larger influence on the user experience.

At present, the media parameters of optional data (that is, substitute data) and original data (that is, original media data stream) are usually different, the existing solution is using a method of re-negotiating parameters, in this way, there is a problem of parameter shifting which will lead to the reduction in communication efficiency.

Aiming at the above-mentioned problems in the relevant art, no effective solution has been presented at present.

SUMMARY

Aiming at the technical problems, such as the reduction in communication efficiency due to the need for re-negotiating a media parameter between substitute data and original media data in the relevant art, the disclosure provides a method and device for sending media data to at least solve the above-mentioned technical problem.

According to one aspect of the disclosure, a method for sending media data is provided. The method is realized by providing a media substitute node between a sender and a receiver. The method comprises: the media substitute node receiving an original media data stream from the sender; the media substitute node acquiring substitute data for substituting for the original media data stream within a designated interval; the media substitute node converting a format of the acquired substitute data into a media format which conforms to a media parameter of the original media data stream; and within the designated interval, the media substitute node sending the above-mentioned converted substitute data to the receiver.

After the designated interval ends, the method further comprises the media substitute node forwarding the original media data stream from the sender to the receiver.

After the media substitute node converts the format of the acquired substitute data into the media format which conforms to the media parameter of the original media data stream, the method further comprises discarding the original media data stream substituted within the designated interval or sending same after the designated interval ends.

The substitute data comprise at least one of the following: data obtained by processing the original media data stream, and pre-designated substitute data.

The media substitute node acquires the substitute data from at least one of the following sources: the sender, the receiver, and equipment of a third side.

The original media data stream comprises at least one of the following: a multimedia video data stream and an audio data stream.

The media parameter of the multimedia video data stream comprises at least one of the following: video compression format, frame rate, band width and resolution; and/or the media parameter of the audio data stream comprises at least one of the following: audio sampling rate, frame rate and compression format.

According to another aspect of the disclosure, provided is a device for sending media data, which is provided on a media substitute node between a sender and a receiver, the device further comprises a receiving component, configured to receive an original media data stream from the sender; an acquisition component, configured to acquire substitute data for substituting for the original media data stream within a designated interval; a conversion component, configured to convert a format of the substitute data into a media format which conforms to a media parameter of the original media data stream; and a sending component, configured to send the converted substitute data to the receiver within the designated interval.

The sending component is further configured to forward the original media data stream from the sender to the receiver after the designated interval ends.

The sending component is further configured to, after converting the format of the acquired substitute data into the media format which conforms to the media parameter of the original media data stream, discard the original media data stream substituted within the designated interval or send same after the designated interval ends.

In the disclosure, the technical solution that a media substitute node, which is provided between a sender and a receiver, converts the format of the substitute data into a media format which conforms to a media parameter of the original media data stream and forwards the converted substitute data is employed to solve the technical problems, such as the reduction in communication efficiency due to the need for re-negotiating a media parameter between substitute data and original media data in the relevant art so as to avoid the re-negotiation of parameters and further improve the media communication efficiency.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

The disclosure is described below with reference to the accompanying drawings and embodiments in detail. Note that, the embodiments of the disclosure and the features of the embodiments may be combined with each other if there is no conflict.

Figure 1:
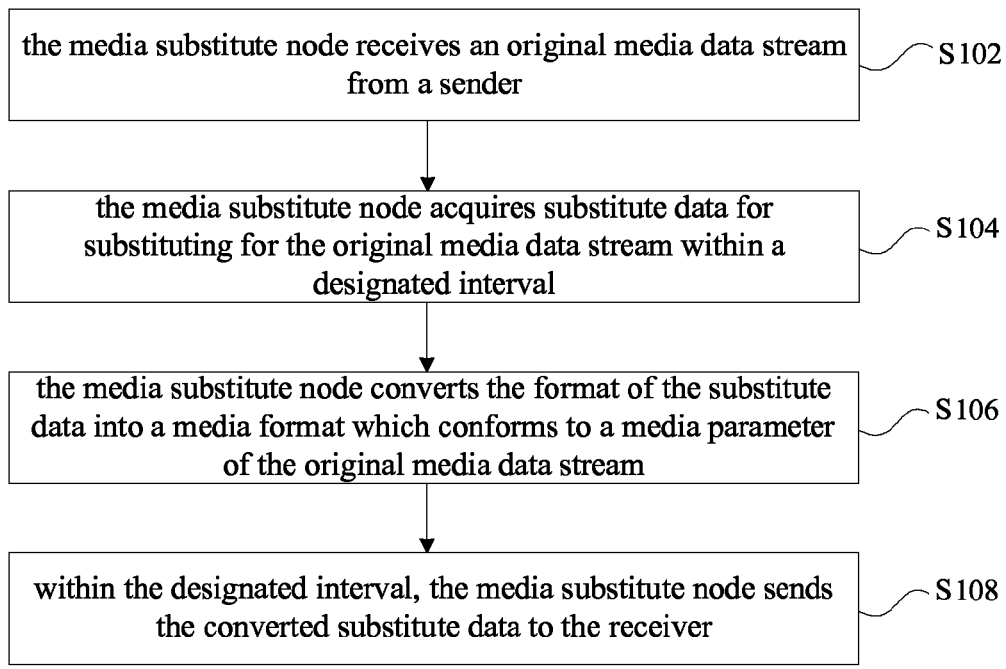
FIG. 1 is a flowchart of a method for sending media data according to an embodiment of the disclosure.

FIG. 1 is a flowchart of a method for sending media data according to an embodiment of the disclosure. The method is realized by providing a media substitute node between a sender and a receiver, as shown in FIG. 1, the method comprises:

step S102, the media substitute node receives an original media data stream from a sender. It should be noted that, the media node may be an independent physical node and also may be a logical node.

step S104, the media substitute node acquires substitute data for substituting for the original media data stream within a designated interval;

step S106, the media substitute node converts the format of the substitute data into a media format which conforms to a media parameter of the original media data stream;

and step S108, within the designated interval, the media substitute node sends the converted substitute data to the receiver.

It should be noted that, the orders for performing the above-mentioned steps S102 and S104 in the present embodiment may be exchanged.

In the above-mentioned processing steps, a media substitute node for forwarding data is provided between a sender and a receiver, and the media substitute node may convert the format of the substitute data into a media format which conforms to a media parameter of the original media data stream; therefore, the problem of the reduction in communication efficiency due to the re-negotiation of parameters is radically avoided.

After the designated interval ends, the media substitute node forwards the original media data stream from the sender to the receiver.

With regard to the original data substituted in the above-mentioned treating process, after the media substitute node converts the format of the acquired substitute data into the media format which conforms to the media parameter of the original media data stream, the original media data stream substituted within the designated interval may be discarded or sent after the designated interval ends.

The above-mentioned substitute data may be a new data stream (that is, designated substitute data) different from the original media data stream and also may be a data stream obtained by processing the original media data stream. With regard to the latter condition, during the specific implementation, it may be represented as the following forms: on the condition that the sender and the receiver use different languages, the language voice of the sender is translated as audio data of the language required by the receiver, and the translated audio data is used as substitute data.

The above-mentioned media substitute node may locally preset the above-mentioned substitute data, and also may acquire the above-mentioned substitute data from the sender or the receiver or the equipment of the third party.

In one preferred implementation of the disclosure, the above-mentioned original media data stream may be a multimedia video data stream. In such a case, the above-mentioned media parameter may comprise at least one of the following: video compression format, frame rate, band width and resolution.

Figure 2:
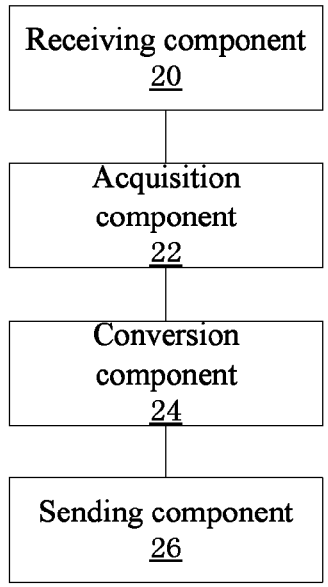
FIG. 2 is a structural block diagram of a device for sending media data according to an embodiment of the disclosure.

A device for sending media data is also provided in the present embodiment, the device is provided on a media substitute node, which is between a sender and a receiver and is provided on a terminal for realizing the above-mentioned embodiments and preferred implementations, which has been described, thereby needing no further description, and components involved in the device are described below. As used as follows, the term "component" may realize the combination of software and/or hardware having reservation functions. Although the device described in the following embodiments is preferably realized by software, it is also possible and contemplated to realize by hardware or the combination of software and hardware. FIG. 2 is a structural block diagram of a device for sending media data according to an embodiment of the disclosure. As shown in FIG. 2, the device comprises:

a receiving component 20, connected to an acquisition component 22 and configured to receive the original media data stream from the sender;

the acquisition component 22, connected to a conversion component 24 and configured to acquire substitute data for substituting the original media data stream within a designated interval;

the conversion component 24, connected to a sending component 26 and arranged to convert the format of the acquired substitute data into a media format which conforms to a media parameter of the original media data stream received by the receiving component 20;

and the sending component 26, configured to send the converted substitute data to the receiver within the designated interval.

With the functions achieved by the above-mentioned components, converting the format of the substitute data into a media format which conforms to a media parameter of the original media data stream also may be realized; therefore, the problem of the reduction in communication efficiency due to the re-negotiation of parameters is radically avoided.

The sending component 26 is further configured to forward the original media data stream from the sender to the receiver after the designated interval ends.

The sending component 26 is further configured to, after converting the format of the acquired substitute data into the media format which conforms to the media parameter of the original media data stream, discard the original media data stream substituted within the designated interval or send same after the designated interval ends.

For a better understanding of the above-mentioned embodiment, detailed description is given below with reference to the accompanying drawings and embodiments. The main design idea for the following embodiments lies in arranging a jointing and substituting gateway (equivalent to a media substitute node). The jointing and substituting gateway is configured to record the parameter (equivalent to the above-mentioned media parameter) of the original data (equivalent to original data or an original data stream), convert data to be used into data conforming to the requirements of the parameter of the original data according to the parameter of the original data, perform data substitution at a jointing starting moment, and perform data recovery to obtain the original data at a jointing ending moment. Based on the above-mentioned thought, the jointing and substituting efficiency may be improved, the waiting time is reduced, thereby having less influence on the receiver and greatly improving the user experience. The jointing and substituting gateway in the following embodiment may be a physical node of an independent entity, and also may be a logical node.

Figure 3:
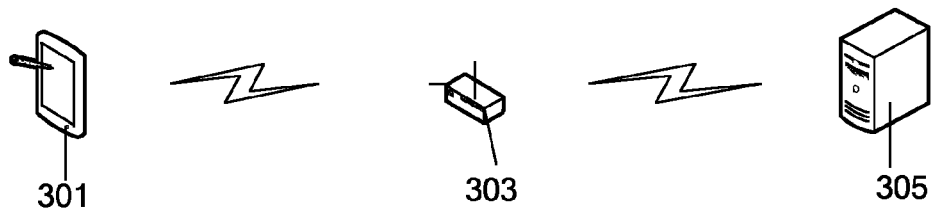
FIG. 3 is a composition schematic diagram of a communication network according to an embodiment of the disclosure.

The following embodiments may be realized by a communication network as shown in FIG. 3. As shown in FIG. 3, the communication network comprises a receiver 301, a jointing and substituting gateway 303 and a sender 305.

Embodiment 1

The present embodiment provides a sending method for jointing and substituting multimedia data, and the method comprises the following treating processes:

a jointing and substituting gateway for realizing the jointing and substituting function is provided between a sender and a receiver, and the jointing and substituting gateway may forward data between the sender and the receiver;

the jointing and substituting gateway may receive and store parameter information (equivalent to the media parameter in the above-mentioned embodiment) of the original multimedia data;

the jointing and substituting gateway converts the substitute data into data of which the format conforms to the parameters of the original multimedia data according to the parameter information of the original multimedia data;

the converted substitute data may be prepared in advance according to the capacity of the jointing and substituting gateway;

the triggering conditions and interval for jointing and substituting is determined, the interval is a duration between the jointing starting moment and the jointing ending moment, the information of the interval may be from a server, or a set timing function, or time information obtained by other manners; the triggering condition may be acquired according to the setting such as time, events.

if the triggering condition is met, the jointing and substituting gateway sends jointing and substituting data in a designated interval but does not send the original data in the interval; and the original data in the interval may be delivered in the future or be discarded;

The receiver receives data from the jointing and substituting gateway and processes the received data according to the original manner.

In the above-mentioned treatment process, although the network node and/or service node is increased by adding the jointing and substituting gateway, the added jointing and substituting gateway provides a richer service capability for multimedia data provided by the network.

Embodiment 2

Figure 4:
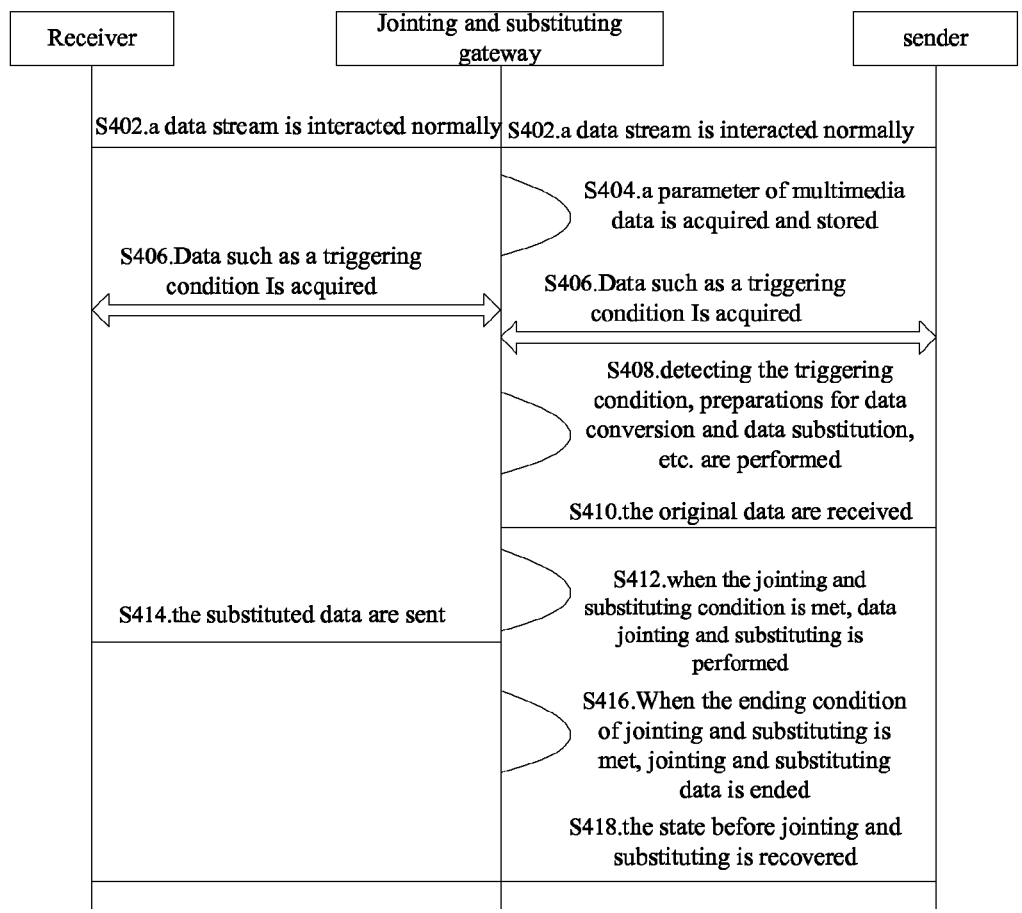
FIG. 4 is a schematic flowchart of jointing and substituting multimedia data according to an embodiment of the disclosure.

The design idea of the present embodiment may be represented as a flow as shown in FIG. 4. The flow as shown in FIG. 4 is briefly described below:

step S402, a multimedia data stream is interacted normally between a sender and a receiver;

step S404, the parameter of original data (that is, the above-mentioned multimedia data stream interacted normally) is acquired and stored;

step S406, data such as a triggering condition for triggering jointing and substituting to be performed is acquired;

step S408, detecting the triggering condition, preparations for data conversion and data substitution, etc. are performed;

step S410, the original data are received;

step S412, when the jointing and substituting condition is met, data jointing and substituting is performed;

step S414, the jointed and substituted data are sent;

step S416, when the ending condition of jointing and substituting is met, the sending of data jointing and substituting is ended;

and step S418, the state before jointing and substituting is recovered, that is, the original data stream is sent.

The following embodiments 3 and 4 may be realized based on the flow as shown in the above-mentioned embodiment 2. Detailed description is given below.

Embodiment 3

The present embodiment is described taking the jointing and substituting of video data as an example. The jointing and substituting solution of the present embodiment may be achieved using the following processing steps:

step 1, the receiver and the sender perform multimedia video data communication through a jointing and substituting gateway;

step 2, in communication, the jointing and substituting gateway acquires multimedia video parameters, such as video compression format, frame rate, band width and resolution, and records and updates parameter data such as time, frame sequence of a video frame;

step 3, the jointing and substituting gateway receives jointing and substituting condition and jointing and substituting data;

in the processing step, the jointing and substituting condition may be from the following aspects: conditional data sent from the sender (similar to a server); conditions set by a user and received by the jointing and substituting gateway or conditional data generated according to other conditions; conditional data from the receiver; or data from a third party;

in the processing step, the source of jointing and substituting data has several aspects: conditional data sent from the sender, local data of the jointing and substituting gateway; data sent from the receiver; or data from the third party;

step 4, the jointing and substituting gateway starts the jointing and substituting function according to configuration and reads corresponding conditional data, jointing and substituting data, parameter conversion data, etc. for example, data such as video parameters, frame time, frame sequence is obtained according to video data in the present embodiment;

step 5, according to parameters, jointing and substituting data, etc. the data format is firstly converted and substituted so as to make a data preparation for a time when the condition is met;

step 6, when the triggering condition is met, jointing and substituting is performed on data at a jointing and substituting starting moment, that is, the original data are substituted by the prepared data, for example, in the embodiment, data such as frame time and frame sequence in the substitute data needs to be update and sent to the receiver; at a jointing and substituting ending moment, the jointing and substituting is ended, and the data are changed to be the original data.

and step 7, the original video data communication is continued;

In the embodiment 4, the meeting translation performed by a jointing and substituting gateway function is taken as an example to describe the jointing and substituting.

The present embodiment describes a case where providing the translation timely to a receiver is realized by a jointing and substituting gateway, for example, a meeting needs to be translated to be different languages, the translation result is sent to different terminals by the jointing and substituting gateway.

step 1, the receiver and the sender perform multimedia video data communication through a jointing and substituting gateway;

step 2, in communication, the jointing and substituting gateway acquires multimedia video parameters, such as video compression format, frame rate, band width and resolution, and records and updates parameter data such as time, frame sequence of the video frame;

and step 3, the jointing and substituting gateway receives the jointing and substituting condition and jointing and substituting data;

for example, in the present embodiment, the condition is that there are different language, data is an audio of a translated language required by a receiver; different from embodiment 3, the data in the present embodiment needs to be translated timely according to the language;

step 4, the jointing and substituting gateway starts the jointing and substituting function according to configuration and reads corresponding conditional data, jointing and substituting data, parameter conversion data, etc. for example, in the present embodiment, it is required to joint the translated data with the original video data to substitute the original audio and video data.

step 5, according to parameters, jointing and substituting data, etc. the substituting data is converted into data of which the format is required when the condition is met;

step 6, when the triggering condition is met, jointing and substituting is performed on data at a jointing and substituting starting moment, that is, the original data are substituted by the prepared data to send to the receiver; at a jointing and substituting ending moment, the jointing and substituting is ended, and the data are changed to be the original data.

and step 7, the original video data communication is continued.

In another embodiment, software is further provided, and the software is used for performing the technical solutions described in the above-mentioned embodiments and preferred implementations.

In another embodiment, a storage medium is further provided, and the above-mentioned software is stored in the storage medium, the storage medium comprises but is not limited to: an optical disk, a floppy disk, a hard disk, a removable storage, etc.

Obviously, those skilled in the art should know that each of the mentioned components or steps of the disclosure can be realized by universal computing systems; the components or steps can be focused on single computing system, or distributed on the network formed by multiple computing systems; selectively, they can be realized by the program codes which can be executed by the computing system; thereby, the components or steps can be stored in the storage system and executed by the computing system; and under some circumstances, the shown or described steps can be executed in different orders, or can be independently manufactured as each integrated circuit component, or multiple components or steps thereof can be manufactured to be single integrated circuit component, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection of the disclosure.

What is claimed is:

1. A method for sending media data, which is realized by providing a media substitute node between a sender and a receiver, wherein the method comprises:
    the media substitute node receiving an original media data stream from the sender;
    the media substitute node acquiring substitute data for substituting for the original media data stream within a designated interval; wherein the substitute data comprise at least one of the following: data obtained by processing the original media data stream, and pre-designated substitute data;
    the media substitute node converting a format of the acquired substitute data into a media format which conforms to one or more media parameters of the original media data stream; and
    the media substitute node sending the converted substitute data to the receiver within the designated interval;
    wherein the original media data stream comprises at least one of the following: a multimedia video data stream and an audio data stream;
    the one or more media parameters of the multimedia video data stream comprises video compression format and at least one of the following: frame rate, band width and resolution;
    and/or the one or more media parameters of the audio data stream comprises the following parameters: audio sampling rate, frame rate and compression format;
    wherein after the media substitute node converts the format of the substitute data into the media format which conforms to the media parameter of the original media data stream, the method further comprises:
    sending the original media data stream substituted within the designated interval after the designated interval ends
    wherein the media substitute node acquires the substitute data from at least one of the following sources: the sender and the receiver.

2. The method according to claim 1, wherein after the designated interval ends, the method further comprise: the media substitute node forwarding the original media data stream from the sender to the receiver.

3. A media substitute node located between a sender and a receiver, the node comprises a processor coupled with a memory, and the processor is configured to execute a programming unit stored in the memory, the programming unit comprises:
    a receiving component, configured to receive an original media data stream from the sender;
    an acquisition component, configured to acquire substitute data for substituting for the original media data stream within a designated interval; wherein the substitute data comprise at least one of the following: data obtained by processing the original media data stream, and pre-designated substitute data;
    a conversion component, configured to convert a format of the substitute data into a media format which conforms to one or more media parameters of the original media data stream; wherein the original media data stream comprises at least one of the following: a multimedia video data stream and an audio data stream;
    the one or more media parameters of the multimedia video data stream comprises video compression format and at least one of the following: frame rate, band width and resolution;

and/or the one or more media parameters of the audio data stream comprises the following parameters: audio sampling rate, frame rate and compression format;

and a sending component, configured to send the converted substitute data to the receiver within the designated interval;

wherein the sending component is further configured to send the original media data stream substituted within the designated interval after the designated interval ends, after the format of acquired the substitute data is converted into the media format which conforms to the media parameter of the original media data stream;

wherein the media substitute node acquires the substitute data from at least one of the following sources: the sender and the receiver.

4. The device according to claim 3, wherein the sending component is further configured to forward the original media data stream from the sender to the receiver after the designated interval ends.

\* \* \* \* \*